(12) United States Patent
Zhang et al.

(10) Patent No.: US 12,707,323 B2
(45) Date of Patent: Aug. 11, 2026

(54) METHOD AND DEVICE USED FOR MONITORING A RADIO LINK STATUS IN WIRELESS COMMUNICATION

(71) Applicant: Apogee 5G Global, LLC, Plano, TX (US)

(72) Inventors: Jinfang Zhang, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 287 days.

(21) Appl. No.: 18/244,312

(22) Filed: Sep. 11, 2023

(65) Prior Publication Data

US 2024/0107370 A1 Mar. 28, 2024

(30) Foreign Application Priority Data

Sep. 28, 2022 (CN) ......................... 202211187664.4

(51) Int. Cl.
*H04W 28/02* (2009.01)
*H04L 1/1829* (2023.01)
*H04W 80/02* (2009.01)

(52) U.S. Cl.
CPC ....... *H04W 28/0278* (2013.01); *H04L 1/1848* (2013.01); *H04W 80/02* (2013.01)

(58) Field of Classification Search
CPC .. H04L 1/1848; H04W 28/0278; H04W 80/02
See application file for complete search history.

(56) References Cited

U.S. PATENT DOCUMENTS

2007/0168826 A1* 7/2007 Terry .................... H04L 1/1848 714/748
2009/0161571 A1* 6/2009 Terry .................... H04W 76/19 370/252
2009/0175175 A1* 7/2009 Somasundaram .... H04W 72/04 370/242

(Continued)

OTHER PUBLICATIONS

Third Generation Partnership Project, "Technical Specification Group Radio Access Network; NR; Radio Link Control (RLC) protocol specification (Release 17)," 3GPP TS 38.322 V17.1.0 (Jun. 2022).

(Continued)

*Primary Examiner* — Melanie Jagannathan
(74) *Attorney, Agent, or Firm* — Volpe Koenig

(57) ABSTRACT

The present application provides a method and device for wireless communications. The first node transmits a first radio signal, the first radio signal carries a first data unit; receives a first status report, the first status report indicates whether the first data unit set is successfully received; maintains a first variable of the first data unit; maintains a second variable; herein, the first status report indicates a negative confirmation for the first data unit; the maintaining a first variable of the first data unit comprises: when the first data unit is considered a first retransmission, setting a value of a first variable of the first data unit to 0; the maintaining a second variable comprises: when all conditions in the first condition set are met, a value of the second variable being increased by 1. The present application effectively monitors radio link.

17 Claims, 5 Drawing Sheets

(56) References Cited

U.S. PATENT DOCUMENTS

2009/0327830 A1* 12/2009 Lee ........................ H04L 1/1887 714/E11.113
2015/0289171 A1* 10/2015 Jung ...................... H04L 1/0001 370/331
2017/0085452 A1* 3/2017 Kato .................... H04L 43/0811
2018/0227805 A1* 8/2018 Jang .................. H04W 28/0278
2018/0302934 A1* 10/2018 Chisu ..................... H04W 76/18
2018/0310192 A1* 10/2018 Bergquist .............. H04L 1/1848
2019/0132766 A1* 5/2019 Yi ........................ H04W 28/085
2019/0208541 A1* 7/2019 Lee .................... H04W 72/0453
2020/0235869 A1* 7/2020 Pradas .................. H04L 1/1896
2020/0344004 A1* 10/2020 Jo .......................... H04W 28/04
2020/0351066 A1* 11/2020 Cirik ...................... H04W 76/27
2021/0076416 A1* 3/2021 Shah ................... H04W 74/085
2021/0127293 A1* 4/2021 Hong ................ H04W 28/0278
2021/0135928 A1* 5/2021 Yi .......................... H04W 72/23
2021/0195674 A1* 6/2021 Park ....................... H04W 76/18
2021/0258109 A1* 8/2021 Cho ....................... H04L 1/1642
2022/0006571 A1* 1/2022 Basu Mallick ....... H04L 1/1816
2022/0210868 A1* 6/2022 Park .................. H04W 28/0278
2022/0232431 A1* 7/2022 Hsieh .................... H04L 1/1621
2022/0377602 A1* 11/2022 Kim ....................... H04W 28/06
2023/0171199 A1* 6/2023 Ganesan ................ H04B 7/155 370/315
2023/0180223 A1* 6/2023 Tseng .................. H04W 56/001 370/329
2023/0232277 A1* 7/2023 Yi ......................... H04W 28/02 370/235
2023/0319630 A1* 10/2023 Kanamarlapudi .... H04W 28/02 370/235
2024/0163031 A1* 5/2024 Koskinen ................ H04L 69/28
2024/0267967 A1* 8/2024 Baek ................... H04W 88/085
2024/0397424 A1* 11/2024 Khoshkholgh Dashtaki ............... H04W 76/28
2024/0406955 A1* 12/2024 Kim .................. H04W 72/1268
2025/0158752 A1* 5/2025 Kanamarlapudi .... H04L 1/1896
2025/0184816 A1* 6/2025 Wang ...................... H04L 47/34
2025/0220484 A1* 7/2025 Lee ....................... H04W 76/27
2025/0220589 A1* 7/2025 Pelletier .............. H04W 52/146

OTHER PUBLICATIONS

Third Generation Partnership Project, "Technical Specification Group Radio Access Network; NR; Radio Resource Control (RRC) protocol specification (Release 17)," 3GPP TS 38.331 V17.1.0 (Jun. 2022).

* cited by examiner

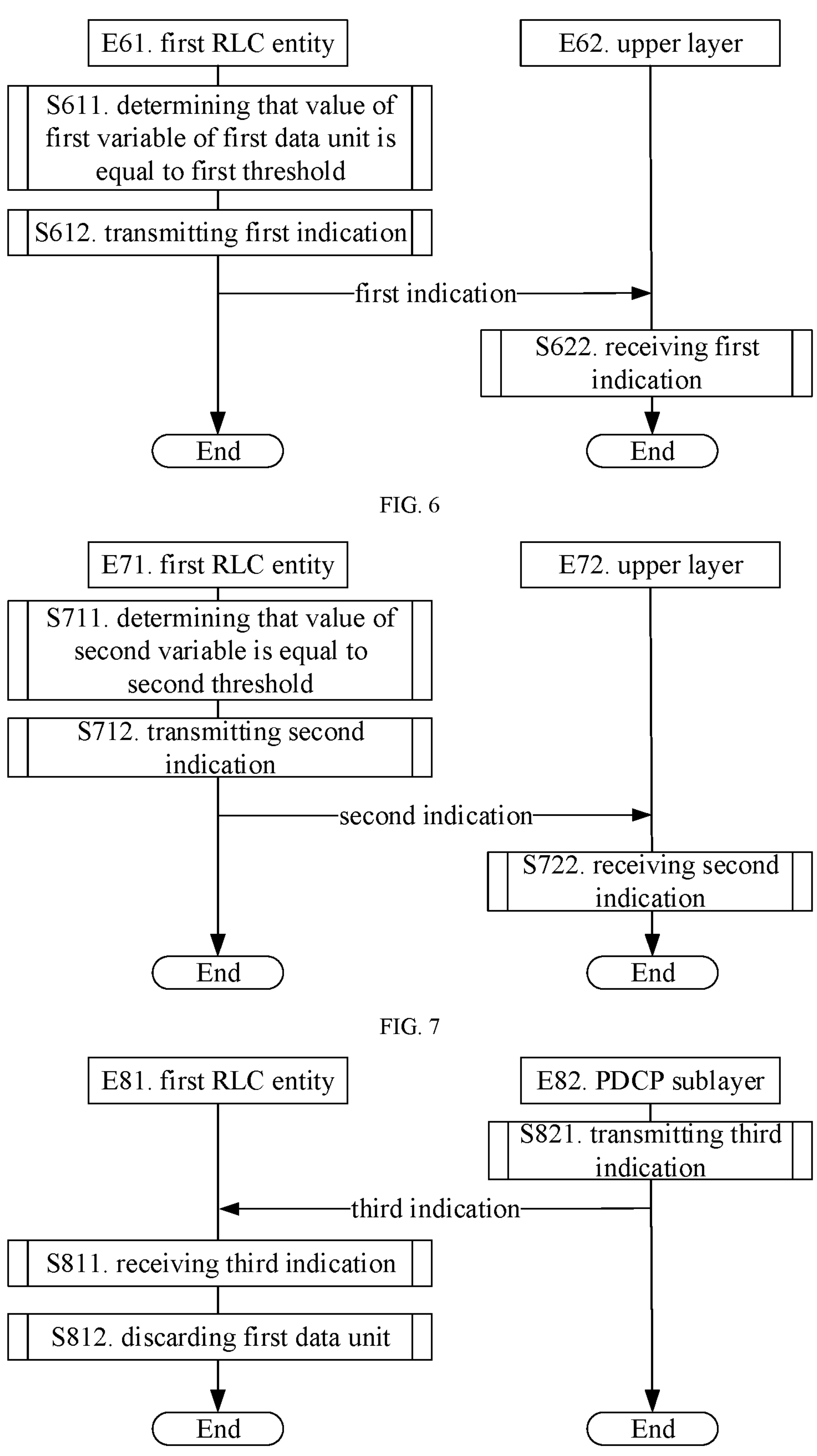
E61. first RLC entity
E62. upper layer
S611. determining that value of first variable of first data unit is equal to first threshold
S612. transmitting first indication
first indication
S622. receiving first indication
End
End
FIG. 6
E71. first RLC entity
E72. upper layer
S711. determining that value of second variable is equal to second threshold
S712. transmitting second indication
second indication
S722. receiving second indication
End
End
FIG. 7
E81. first RLC entity
E82. PDCP sublayer
S821. transmitting third indication
third indication
S811. receiving third indication
S812. discarding first data unit
End
End
FIG. 8

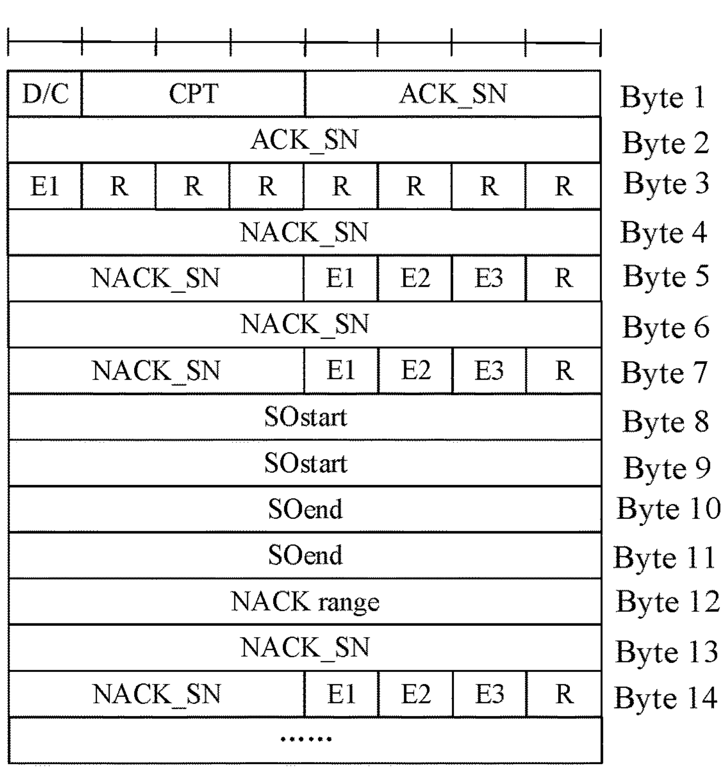
FIG. 10
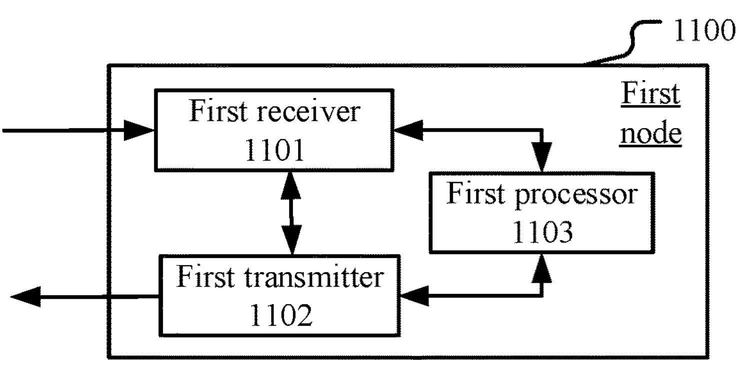
FIG. 11
1200
Second node
Second receiver 1201
Second transmitter 1202
FIG. 12

METHOD AND DEVICE USED FOR MONITORING A RADIO LINK STATUS IN WIRELESS COMMUNICATION

CROSS REFERENCE TO RELATED APPLICATIONS

This application claims the priority benefit of Chinese Patent Application No. 202211187664.4, filed on Sep. 28, 2022, the full disclosure of which is incorporated herein by reference.

BACKGROUND

Technical Field

The present application relates to methods and devices in wireless communication systems, particularly to a method and device for monitoring a radio link status when delay sensitive services are supported in wireless communications.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary session decided to conduct the study of New Radio (NR), or what is called fifth Generation (5G). The work Item (WI) of NR was approved at the 3GPP RAN #75 plenary session to standardize the NR. In response to the rapid development of eXtended Reality (XR) and Cloud Gaming (CG) usage scenarios and services, 3GPP RANI launched a Study Item (SI) of Study on XR Evaluations for NR in version 17. The study identified XR and CG as important usage scenarios and services for version 18 and subsequent versions. XR and CG refer to various types of augmented, virtual, and mixed environments that perform human-machine communications with the help of handheld and wearable end User Equipment (UE). Many XR and CG use cases have the business characteristics of quasi-periodic, high data rate, and stricter packet delay budgets (PDBs), which pose a series of challenges to NR.

SUMMARY

Inventors have found through researches that in RAN transmission, each Quality of Service (QoS) flow is characterized by a QoS profile, which comprises a maximum transmission delay of data packets, that is, a maximum delay of data packets from being received to being transmitted. Within a maximum latency, the data packet is valid; after exceeding a maximum latency, the data packet becomes useless at the application layer. For delay sensitive services, when a data packet times out, it can be discarded and no longer transmitted through radio network to effectively utilize radio resources and reduce UE power consumption. But when the data packet has been submitted to the lower layer for transmission, discarding the data packet in the upper layer (e.g. RLC (Radio Link Control Protocol) sublayer) without further retransmission will cause the UE to fail to retransmit the data packet to a maximum number of retransmissions configured by the network, thus affecting the judgment of radio link status.

In response to the above issues, the present application discloses a solution for services with strict delay requirements. After discarding data packets that cannot meet the delay requirements, a new mechanism is designed in RLC sublayer to determine the radio link status, on the one hand, it can release transmission resources for other data transmission, effectively improving system capacity and reducing UE power consumption; It can also effectively support the detection of radio link failures. And the embodiments in the present application and the characteristics in the embodiments can be arbitrarily combined if there is no conflict. Further, although the present application was originally intended for a Uu air interface, it can also be applied to a PC5 air interface. Further, although the present application is originally targeted at terminal and base station scenarios, it is also applicable to scenarios of relay and base station, where similar technical effects can be achieved. Additionally, the adoption of a unified solution for various scenarios, including but not limited to V2X scenarios and communication scenarios between terminals and base stations, contributes to the reduction of hardware complexity and costs. Particularly, for interpretations of the terminology, nouns, functions and variants (if not specified) in the present application, refer to definitions given in TS36 series, TS38 series and TS37 series of 3GPP specifications.

The present application provides a method in a first node for wireless communications, comprising:

- transmitting a first radio signal, the first radio signal carrying a first data unit;
- receiving a first status report at a first RLC entity, the first status report indicating whether a first data unit set is successfully received, the first data unit set comprising the first data unit;
- maintaining a first variable of the first data unit; and
- maintaining a second variable;
- herein, the first status report indicates a negative confirmation for the first data unit, and the first status report indicating a negative confirmation for the first data unit is considered retransmission for the first data unit; the maintaining a first variable of the first data unit comprises: when the first data unit is considered a first retransmission, a value of the first variable of the first data unit being set to 0; the maintaining a second variable comprises: when all conditions in the first condition set are met, a value of the second variable being increased by 1; the first condition set comprises that the value of the first variable of the first data unit is less than a first threshold and the first data unit is indicated to be discarded.

In one embodiment, the present application is applicable to time-delay sensitive service.

In one embodiment, the present application is applicable to XR service.

In one embodiment, the present application is applicable to the transmitting side of an RLC entity.

In one embodiment, a problem to be solved in the present application comprises: when a data packet expires, discarding it and not continuing to retransmit it will result in the retransmission of the packet not reaching the maximum number of retransmissions configured by the network, thereby affecting the judgment of radio link status.

In one embodiment, solutions of the present application include: monitoring a radio link status by simultaneously maintaining a first variable and a second variable of a first data unit.

In one embodiment, the above method can effectively monitor radio link status by maintaining a second variable.

According to one aspect of the present application, comprising:

the maintaining a second variable comprises: when the first status report indicates a positive confirmation for any data unit, set the value of the second variable to 0.

According to one aspect of the present application, comprising:

when the value of the first variable of the first data unit is equal to the first threshold, transmitting a first indication to an upper layer of the first node, the first indication indicating reaching a maximum number of retransmissions.

In one embodiment, the above method can trigger a maintenance of a radio link by indicating to the upper layer.

According to one aspect of the present application, comprising:

when the value of the second variable is equal to a second threshold, transmitting a second indication to an upper layer of the first node.

In one embodiment, the above method can trigger a maintenance of a radio link by indicating to the upper layer.

According to one aspect of the present application, comprising:

receiving a first PDCP SDU at a PDCP sublayer, starting a first timer; when the first timer expires, transmitting a third indication to the first RLC entity;

herein, the first PDCP SDU is used to generate the first data unit, and the third indication is used to indicate discarding the first data unit.

According to one aspect of the present application, comprising:

as a response to receiving the third indication, discarding the first data unit;

herein, the first RLC entity is associated with the first-type radio bearer.

In one embodiment, the above method effectively improves the utilization rate of radio resources.

In one embodiment, the above method reduces UE power consumption.

In one embodiment, the above method is different from the existing technologies in that it can further save radio resources by discarding data units that have been submitted to the lower layer for transmission.

According to one aspect of the present application, comprising:

the maintaining a first variable of the first data unit comprises, when the first data unit is not considered the first retransmission and is not pending for retransmission, and the first variable of the first data unit has not been increased due to another negative confirmation in the first status report, the value of the first variable of the first data unit is increased by 1.

The present application provides a method in a second node for wireless communications, comprising:

receiving a first radio signal, the first radio signal carrying a first data unit; and transmitting a first status report, the first status report indicating whether a first data unit set is successfully received, the first data unit set comprising the first data unit;

herein, a first variable of the first data unit is maintained; a second variable is maintained; the first status report indicates a negative confirmation for the first data unit, and the first status report indicating a negative confirmation for the first data unit is considered retransmission for the first data unit; a first variable of the first data unit being maintained comprises: when the first data unit is considered a first retransmission, a value of the first variable of the first data unit being set to 0; the second variable being maintained comprises: when all conditions in the first condition set are met, a value of the second variable being increased by 1; the first condition set comprises that the value of the first variable of the first data unit is less than a first threshold and the first data unit is indicated to be discarded.

According to one aspect of the present application, comprising:

the second variable being maintained comprises: when the first status report indicates a positive confirmation for any data unit, the value of the second variable is set to 0.

According to one aspect of the present application, comprising:

when the value of the first variable of the first data unit is equal to the first threshold, transmitting a first indication to an upper layer of a transmitter of the first radio signal, and the first indication indicating reaching a maximum number of retransmissions.

According to one aspect of the present application, comprising:

when the value of the second variable is equal to a second threshold, a second indication being transmitted to an upper layer of a transmitter of the first radio signal.

According to one aspect of the present application, comprising:

when a first PDCP SDU is received at a PDCP sublayer, a first timer is started; when the first timer expires, a third indication is transmitted to the first RLC entity;

herein, the first PDCP SDU is used to generate the first data unit, and the third indication is used to indicate discarding the first data unit.

According to one aspect of the present application, comprising:

as a response to receiving the third indication, the first data unit is discarded;

herein, the first RLC entity is associated with the first-type radio bearer.

According to one aspect of the present application, comprising:

the maintaining a first variable of the first data unit comprises, when the first data unit is not considered the first retransmission and is not pending for retransmission, and the first variable of the first data unit has not been increased due to another negative confirmation in the first status report, the value of the first variable of the first data unit is increased by 1.

The present application provides a first node for wireless communications, comprising:

a first transmitter, transmitting a first radio signal, the first radio signal carrying a first data unit;

a first receiver, receiving a first status report at a first RLC entity, the first status report indicating whether a first data unit set is successfully received, the first data unit set comprising the first data unit; and a first processor, maintaining a first variable of the first data unit; maintaining a second variable;

herein, the first status report indicates a negative confirmation for the first data unit, and the first status report indicating a negative confirmation for the first data unit is considered retransmission for the first data unit; the maintaining a first variable of the first data unit comprises: when the first data unit is considered a first retransmission, a value of the first variable of the first data unit being set to 0; the maintaining a second variable comprises: when all conditions in the first condition set are met, a value of the second variable being increased by 1; the first condition set comprises that the value of the first variable of the first data unit is less than a first threshold and the first data unit is indicated to be discarded.

The present application provides a second node for wireless communications, comprising:

a second receiver, receiving a first radio signal, the first radio signal carrying a first data unit; and a second transmitter, transmitting a first status report, the first status report indicating whether a first data unit set is successfully received, the first data unit set comprising the first data unit;

herein, a first variable of the first data unit is maintained; a second variable is maintained; the first status report indicates a negative confirmation for the first data unit, and the first status report indicating a negative confirmation for the first data unit is considered retransmission for the first data unit; a first variable of the first data unit being maintained comprises: when the first data unit is considered a first retransmission, a value of the first variable of the first data unit being set to 0; the second variable being maintained comprises: when all conditions in the first condition set are met, a value of the second variable being increased by 1; the first condition set comprises that the value of the first variable of the first data unit is less than a first threshold and the first data unit is indicated to be discarded.

BRIEF DESCRIPTION OF THE DRAWINGS

Other features, objects and advantages of the present application will become more apparent from the detailed description of non-restrictive embodiments taken in conjunction with the following drawings:

FIG. 6 illustrates a flowchart of signal transmission according to one embodiment of the present application;

FIG. 7 illustrates a flowchart of another signal transmission according to one embodiment of the present application;

FIG. 8 illustrates a third flowchart of signal transmission according to one embodiment of the present application;

FIG. 10 illustrates a schematic diagram of a first status report structure according to one embodiment of the present application;

FIG. 11 illustrates a structure block diagram of a processor in a first node according to one embodiment of the present application;

FIG. 12 illustrates a structure block diagram of a processor in second node according to one embodiment of the present application.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
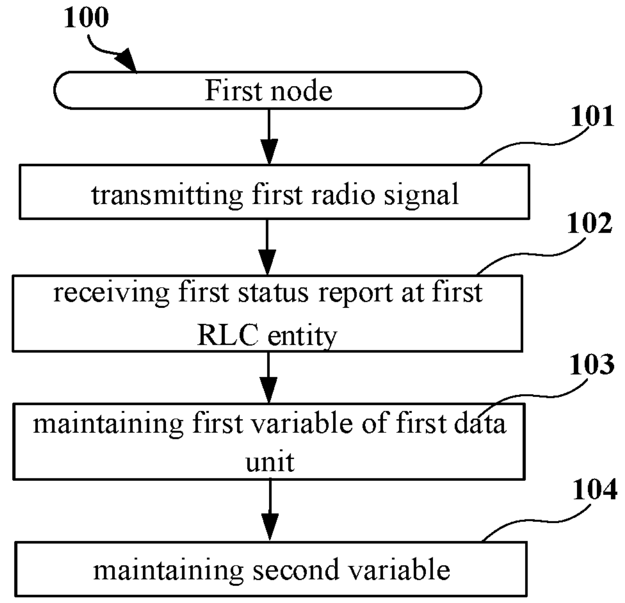
FIG. 1 illustrates a flowchart of transmission of a first node according to one embodiment of the present application.

Embodiment 1 illustrates a flowchart of transmission of a first node according to one embodiment of the present application, as shown in FIG. 1.

In embodiment 1, a first node 100 transmits a first radio signal in step 101, and the first radio signal carries a first data unit; receives a first status report at a first RLC entity in step 102, the first status report indicates whether a first data unit set is successfully received, the first data unit set comprises the first data unit; maintains a first variable of the first data unit in step 103; maintains a second variable in step 104; herein, the first status report indicates a negative confirmation for the first data unit, and the first status report indicates that a negative confirmation for the first data unit is used to confirm a retransmission for the first data unit; the maintaining a first variable of the first data unit comprises: when the first data unit is considered a first retransmission, a value of the first variable of the first data unit being set to 0; the maintaining a second variable comprises: when all conditions in the first condition set are met, a value of the second variable being increased by 1; the first condition set comprises that the value of the first variable of the first data unit is less than a first threshold and the first data unit is indicated to be discarded.

In one embodiment, a first radio signal is transmitted through an air interface.

In one embodiment, the air interface is a Uu air interface.

In one embodiment, the radio interface is a PC5 air interface.

In one embodiment, the first radio signal carries a first data unit.

In one embodiment, the first data unit comprises user data.

In one embodiment, the first data unit comprises XR application data.

In one embodiment, the first data unit comprises data for delay sensitive services.

In one embodiment, the first data unit comprises at least one bit.

In one embodiment, the first data unit comprises at least one byte.

In one embodiment, the first data unit is used to generate a first Medium Access Control (MAC) Protocol Data Unit (PDU).

In one embodiment, all or partial bits of the first MAC PDU are used to generate the first radio signal.

In one embodiment, all or partial bits of the first MAC PDU are used together with a reference signal to generate the first radio signal.

In one embodiment, all or partial bits in a first MAC PDU acquire the first radio signal sequentially through CRC Calculation, Channel Coding, Rate matching, Scrambling, Modulation, Layer Mapping, Antenna Port Mapping, Mapping to Virtual Resource Blocks, Mapping from Virtual to Physical Resource Blocks, OFDM Baseband Signal Generation, Modulation and Up conversionChannel Coding, Rate matching, Scrambling, Modulation, Layer Mapping, Antenna Port Mapping, Mapping to Virtual Resource Blocks, Mapping from Virtual to Physical Resource Blocks, OFDM, OFDM Baseband Signal Generation and Modulation and Up conversion.

In one embodiment, the first data unit set is transmitted through the first RLC entity.

In one embodiment, a first status report is received at a first RLC entity.

In one embodiment, the first status report is transmitted by a peer RLC entity of the first RLC entity to the first RLC entity.

In one embodiment, the first RLC entity is located at the first node.

In one embodiment, the first RLC entity is located at RLC sub layer of the first node.

In one embodiment, the first RLC entity serves as a transmitting side; the peer RLC entity of the first RLC entity serve as a receiving side.

In one embodiment, the first RLC entity is an Acknowledged Mode (AM) RLC entity.

In one embodiment, the first status report is an RLC control PDU.

In one embodiment, the first status report is a STATUS PDU.

In one embodiment, the first status report is used by the receiving side of the AM RLC entity to notify the successful reception of an RLC data PDU by the peer AM RLC entity, as well as the detection of lost RLC data PDUs by the receiving side of the AM RLC entity.

In one embodiment, an RLC data PDU is generated by either an RLC Service Data Unit (SDU) or an RLC SDU segment.

In one embodiment, an RLC data PDU is generated by adding an RLC SDU to an RLC protocol header, or an RLC data PDU is generated by adding an RLC SDU to an RLC protocol header.

In one embodiment, an RLC SDU segment comprises partial bits of an RLC SDU.

In one embodiment, the first status report indicates whether a first data unit set is successfully received, the first data unit set comprises the first data unit.

In one embodiment, the first status report indicates whether each data unit in a first data unit set is negative acknowledgement or positive acknowledgement; herein, the negative acknowledgement indication is not successfully received, and the positive acknowledgement indication is successfully received.

In one embodiment, the first data unit set comprises an RLC SDU, or an RLC SDU segment.

In one embodiment, the first data unit is an RLC SDU.

In one embodiment, the first data unit is an RLC SDU segment.

In one embodiment, the first data unit is an RLC data PDU.

In one embodiment, the first radio signal one in a first radio signal set, and the first radio signal set carries the first data unit set.

In one embodiment, the first status report indicates a negative acknowledgement for the first data unit.

In one embodiment, the first status report indicates that the first data unit is not successfully received.

In one embodiment, the first status report indicates that a negative acknowledgement for the first data unit is used to consider a retransmission for the first data unit.

In one embodiment, the first data unit not being successfully received is used to trigger a retransmission for the first data unit.

In one embodiment, the retransmission is an RLC retransmission.

In one embodiment, the retransmission belongs to Automatic Repeat request process.

In one embodiment, a first variable of the first data unit is maintained.

In one embodiment, a first variable of the first data unit is maintained at the first RLC entity.

In one embodiment, the first variable is a non-negative integer.

In one embodiment, maintain a variable for each data unit indicated as negative confirmation in the first data unit set.

In one embodiment, maintain a variable for an RLC SDU to which each data unit indicated as a negative confirmation belongs in the first data unit set.

In one embodiment, the first variable of the first data unit is RLC SDU granularity.

In one embodiment, when the first data unit is an RLC SDU segment, the first variable of the first data unit is a variable maintained by an RLC SDU to which the first data unit belongs.

In one embodiment, when the first data unit is an RLC SDU segment, a variable belonging to at least one other RLC SDU segment of a same RLC SDU as the first data unit is the first variable.

In one embodiment, a name of the first variable mentioned is RETX_COUNT.

In one embodiment, the first variable count of the first data unit counts a number of times the first data unit has been retransmitted.

In one embodiment, the first variable count of the first data unit counts a number of retransmissions of at least two RLC SDU segments comprised in an RLC SDU to which the first data unit belongs, herein, the first data unit is an RLC SDU segment.

In one embodiment, a second variable is maintained.

In one embodiment, a second variable is maintained in the first RLC entity.

In one embodiment, the second variable is a non-negative integer.

In one embodiment, a name of the second variable comprises SDU.

In one embodiment, a name of the second variable comprises COUNT.

In one embodiment, the maintaining a first variable of the first data unit comprises: when the first data unit is considered a first retransmission, a value of the first variable of the first data unit being set to 0.

In one embodiment, the first data unit being considered as a first retransmission comprises: the first status report indicates that a negative confirmation for the first data unit is a first negative confirmation.

In one embodiment, the first data unit being considered as a first retransmission comprises: a status report indicating a negative confirmation for the first data unit is not received before the first status report.

In one embodiment, the maintaining a first variable of the first data unit comprises: a first variable of the first data unit is only maintained after receiving a negative acknowledgment for the first data unit.

In one embodiment, the maintaining a first variable of the first data unit comprises: a first variable of the first data unit is only maintained after the first data unit is not been successfully received.

In one embodiment, the maintaining a first variable of the first data unit comprises: after the first data unit is successfully received, the first variable of the first data unit is released.

In one embodiment, the maintaining a second variable comprises: when all conditions in the first condition set are met, a value of the second variable being increased by 1.

In one embodiment, the first condition set comprises that the value of the first variable of the first data unit is less than a first threshold and the first data unit is indicated to be discarded.

In one embodiment, the first threshold is configured by network.

In one embodiment, the first threshold is pre-configured.

In one embodiment, the first threshold is configured to the first RLC entity.

In one embodiment, the first condition set comprises the first data unit belonging to a first-type radio bearer.

In one embodiment, the first condition set comprises the first data unit belonging to a first-type logical channel.

In one embodiment, the first-type logical channel is associated with the first-type radio bearer.

In one embodiment, the first-type radio bearer is used for XR services.

In one embodiment, the first-type radio bearer is used for delay sensitive services.

In one embodiment, the first-type radio bearer is used for delay sensitive QoS flows.

In one embodiment, the first-type radio bearer is an eXtended Reality radio bearer (XRB).

Embodiment 2

Figure 2:
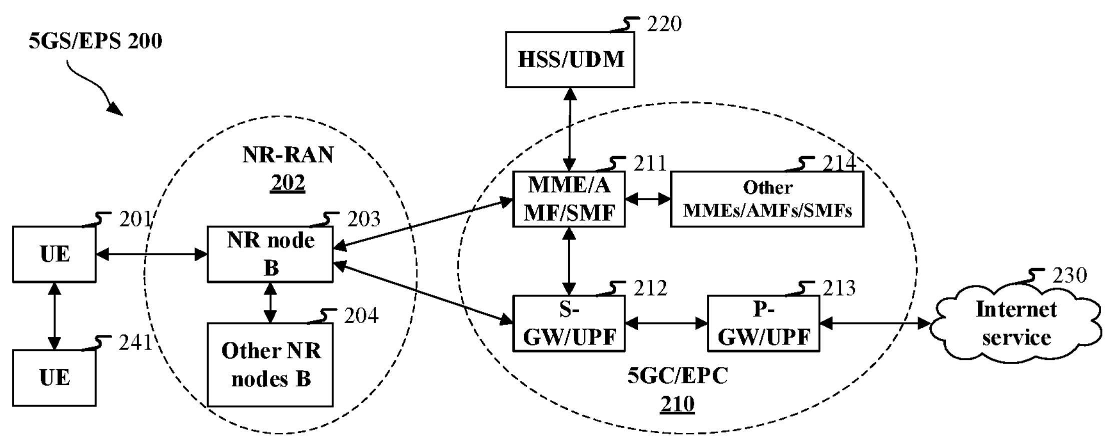
FIG. 2 illustrates a schematic diagram of a network architecture according to one embodiment of the present application.

Embodiment 2 illustrates a schematic diagram of a network architecture according to one embodiment of the present application, as shown in FIG. 2. FIG. 2 is a diagram illustrating a network architecture 200 of 5G NR, Long-Term Evolution (LTE), and Long-Term Evolution Advanced (LTE-A) systems. The NR 5G, LTE or LTE-A network architecture 200 may be called a 5G System (5GS)/Evolved Packet System (EPS) 200 or other appropriate terms. The 5GS/EPS 200 may comprise one or more UEs 201, an NG-RAN 202, a 5G-Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present application can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). XnAP protocol of Xn interface is used to transmit control plane messages of wireless networks, and user plane protocol of Xn interface is used to transmit user plane data. The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms, and in Non Terrestrial Networks (NTNs), the gNB 203 can be a satellite, an aircraft or a terrestrial base station relayed through a satellite. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), aircrafts, narrow-band physical network devices, machine-type communication devices, land vehicles, automobiles, vehicle equipment, On-board communication unit, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present application, and the gNB 203 corresponds to the second node in the present application.

In one embodiment, the gNB 203 corresponds to a first node in the present application, and the UE 201 corresponds to a second node in the present application.

In one embodiment, the UE 201 corresponds to a first node in the present application, and the UE 241 corresponds to a second node in the present application.

In one embodiment, the UE 241 corresponds to a first node in the present application, and the UE 201 corresponds to a second node in the present application.

In one embodiment, the UE 201 is a UE.

In one embodiment, the UE 201 is a relay device.

In one embodiment, the UE 201 is a RoadSide Unit (RSU).

In one embodiment, the UE 241 is a UE.

In one embodiment, the UE 241 is a relay device.

In one embodiment, the UE 241 is a RoadSide Unit (RSU).

In one embodiment, the gNB 203 is a Marco Cell base station.

In one embodiment, the gNB 203 is a Micro Cell base station.

In one embodiment, the gNB 203 is a Pico Cell base station.

In one embodiment, the gNB 203 is a Femtocell.

In one embodiment, the gNB 203 is a base station that supports large delay differences.

In one embodiment, the gNB 203 is a flight platform.

In one embodiment, the gNB 203 is satellite equipment.

In one embodiment, the gNB 203 is a base station that supports large delay differences.

In one embodiment, the gNB 203 is a test device (e.g., a transceiver device simulating some functions of a base station, a signaling tester).

In one embodiment, a radio link from the UE 201 to the gNB 203 is an uplink, and the uplink is used for UE 201 is a downlink, and the downlink is used for executing an uplink transmission.

In one embodiment, a radio link from the gNB 203 to the UE 201 is a downlink, and the downlink is used for executing an uplink transmission.

In one embodiment, a radio link between the UE 201 and the UE 241 is a sidelink, and the sidelink is used for executing a sidelink transmission.

In one embodiment, the UE 201 and the gNB 203 are connected via a Uu air interface.

In one embodiment, the UE 201 and the UE 241 are connected via a PC5 air interface.

Embodiment 3

Figure 3:
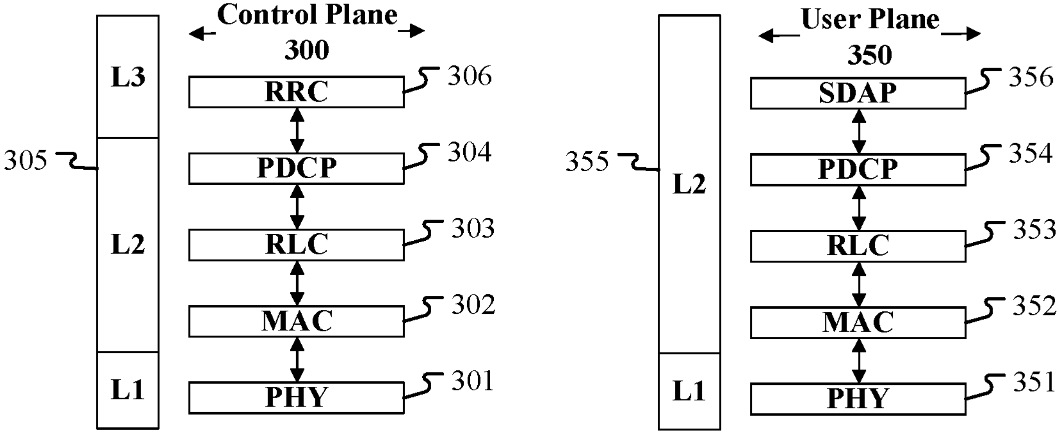
FIG. 3 illustrates a schematic diagram of a radio protocol architecture of a user plane and a control plane according to one embodiment of the present application.

Embodiment 3 illustrates a schematic diagram of a radio protocol architecture of a user plane and a control plane according to one embodiment of the present application, as shown in FIG. 3. FIG. 3 is a schematic diagram illustrating an embodiment of a radio protocol architecture of a user plane 350 and a control plane 300. In FIG. 3, the radio protocol architecture for the control plane 300 of a UE and a gNB is represented by three layers, which are a layer 1, a layer 2 and a layer 3, respectively. The layer 1 (L1) is the lowest layer and performs signal processing functions of various PHY layers. The L1 is called PHY 301 in the present application. The layer 2 (L2) 305 is above the PHY 301, and is in charge of the link between the UE and the gNB via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. The PDCP sublayer 304 provides data encryption and integrity protection and also provides support for a UE handover between gNBs. The RLC sublayer 303 provides packet segmentation and reassembly, and achieves retransmission of lost packets through Automatic Repeat Request (ARQ). The RLC sublayer 303 also provides repeat packet detection and protocol error detection. The MAC sublayer 302 provides mapping between a logic channel and a transport channel and multiplexing of the logical channel. The MAC sublayer 302 is also responsible for allocating between UEs various radio resources (i.e., resources block) in a cell. The MAC sublayer 302 is also responsible for Hybrid Automatic Repeat Request (HARQ) operation. The Radio Resource Control (RRC) sublayer 306 in layer 3 (L3) of the control plane 300 is responsible for acquiring radio resources (i.e., radio bearer) and configuring the lower layer with an RRC signaling between the gNB and the UE. The radio protocol architecture of the user plane 350 comprises layer 1 (L1) and layer 2 (L2). In the user plane 350, the radio protocol architecture is almost the same as the corresponding layer and sublayer in the control plane 300 for physical layer 351, PD CP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. The radio protocol architecture of the UE in the user plane 350 may comprises part or all of protocol sublayers of the SDAP sublayer 356, the PDCP sublayer 354, the RLC sublayer 353 and the MAC sublayer 352 at L2 layer. Although not described in FIG. 3, the UE may comprise several upper layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, entities of multiple sublayers of the control plane in FIG. 3 form an SRB in the vertical direction.

In one embodiment, entities of multiple sublayers of the user plane in FIG. 3 form a DRB in the vertical direction.

In one embodiment, entities of multiple sublayers of the user plane in FIG. 3 form an MRB in the vertical direction.

In one embodiment, the first data unit set in the present application is generated by the RLC 353.

In one embodiment, the first data unit in the present application is generated by the RLC 353.

In one embodiment, the first status report in the present application is generated in the RLC 303.

In one embodiment, the first status report in the present application is generated in the RLC 353.

In one embodiment, a first variable of a first data unit in the present application is maintained at the RLC 303.

In one embodiment, a first variable of a first data unit in the present application is maintained at the RLC 353.

In one embodiment, a second variable in the present application is maintained at the RLC 303.

In one embodiment, a second variable in the present application is maintained at the RLC 353.

In one embodiment, the first indication in the present application is generated in the RLC 303.

In one embodiment, the first indication in the present application is generated in the RLC 353.

In one embodiment, the second indication in the present application is generated in the RLC 303.

In one embodiment, the second indication in the present application is generated in the RLC 353.

In one embodiment, the third indication in the present application is generated in the PDCP 304.

In one embodiment, the third indication in the present application is generated in the PDCP 354.

In one embodiment, the third indication in the present application is generated in the MAC 302.

In one embodiment, the third indication in the present application is generated in the MAC 352.

In one embodiment, in a protocol layer, a data unit received from the upper layer is an SDU, and a data unit processed by the protocol layer is a PDU, which is submitted to the lower layer.

In one embodiment, in a protocol layer, a data unit received from the lower layer is a PDU, and a data unit processed by the protocol layer is an SDU, which is submitted to the upper layer.

In one embodiment, the L2 layer 305 or 355 belongs to an upper layer.

In one embodiment, the L3 layer RRC sublayer 306 belongs to an upper layer.

Embodiment 4

Figure 4:
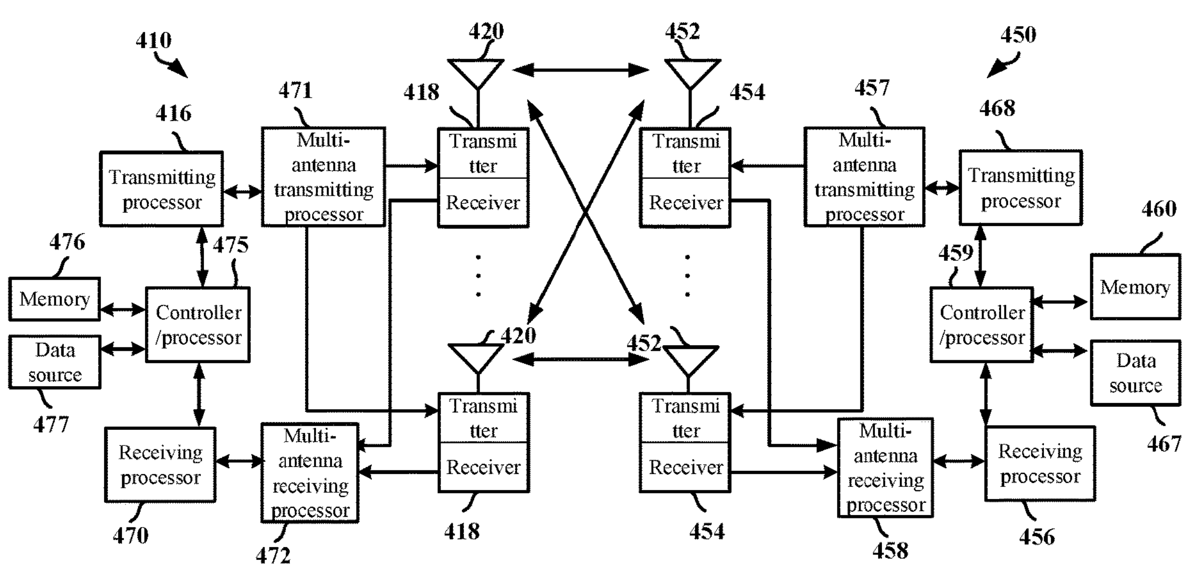
FIG. 4 illustrates a schematic diagram of hardware modules of a communication device according to one embodiment of the present application.

Embodiment 4 illustrates a schematic diagram of hardware modules of a communication device according to one embodiment of the present application, as shown in FIG. 4. FIG. 4 is a block diagram of a first communication device 450 in communication with a second communication device 410 in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a data source 477, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, an upper layer packet from the core network or an upper layer packet from the data source 477 is provided to the controller/processor 475. The core network and the data source 477 represents all protocol layers above the L2 layer. The controller/processor 475 provides a function of the L2 layer. In the transmission from the second communication device 410 to the first communication device 450, the controller/processor 475 provides header compression, encryption, packet segmentation and reordering, and multiplexing between a logical channel and a transport channel, and radio resources allocation for the first communication device 450 based on various priorities. The controller/processor 475 is also responsible for retransmission of a lost packet and a signaling to the first communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 410 side, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the second communication device 410 to the first communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the first communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the second communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In a transmission from the second communication device 410 to the first communication device 450, the controller/processor 459 provides multiplexing between a transport channel and a logical channel, packet reassembling, decryption, header decompression, control signal processing so as to recover a higher-layer packet from the second communication device 410. The higher-layer packet is later provided to all protocol layers above the L2 layer, or various control signals can be provided to the L3 layer for processing.

In a transmission from the first communication device 450 to the second communication device 410, at the second communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel so as to provide the L2 layer functions used for the user plane and the control plane. The controller/processor 459 is also responsible for retransmission of a lost packet, and a signaling to the second communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the first communication device 450 to the second communication device 410, the function at the second communication device 410 is similar to the receiving function at the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the first communication device 450 to the second communication device 410, the controller/processor 475 provides demultiplexing between a transport channel and a logical channel, packet reassembling, decryption, header decompression, control signal processing so as to recover a higher-layer packet from the first communication device 450. The upper layer packet from the controller/processor 475 can be provided to all protocol layers above the core network or the L2 layer, and various control signals can also be provided to the core network or L3 layer for L3 layer processing.

In one embodiment, the first communication device 450 comprises: at least one processor and at least one memory. The at least one memory comprises computer program codes; the at least one memory and the computer program codes are configured to be used in collaboration with the at least one processor, the first communication device 450 at least: transmits a first radio signal, the first radio signal carries a first data unit; receives a first status report at a first RLC entity, the first status report indicates whether a first data unit set is successfully received, the first data unit set comprises the first data unit; maintains a first variable of the first data unit; maintains a second variable; herein, the first status report indicates a negative confirmation for the first data unit, and the first status report indicating a negative confirmation for the first data unit is considered retransmission for the first data unit; the maintaining a first variable of the first data unit comprises: when the first data unit is considered a first retransmission, a value of the first variable of the first data unit being set to 0; the maintaining a second variable comprises: when all conditions in the first condition set are met, a value of the second variable being increased by 1; the first condition set comprises that the value of the first variable of the first data unit is less than a first threshold and the first data unit is indicated to be discarded.

In one embodiment, the first communication device 450 comprises: a memory that stores a computer readable instruction program. The computer readable instruction program generates an action when executed by at least one processor. The action includes: transmitting a first radio signal, the first radio signal carrying a first data unit; receiving a first status report at a first RLC entity, the first status report indicating whether a first data unit set is successfully received, the first data unit set comprising the first data unit; maintaining a first variable of the first data unit; maintaining a second variable; herein, the first status report indicates a negative confirmation for the first data unit, and the first status report indicating a negative confirmation for the first data unit is considered retransmission for the first data unit; the maintaining a first variable of the first data unit comprises: when the first data unit is considered a first retransmission, a value of the first variable of the first data unit being set to 0; the maintaining a second variable comprises: when all conditions in the first condition set are met, a value of the second variable being increased by 1; the first condition set comprises that the value of the first variable of the first data unit is less than a first threshold and the first data unit is indicated to be discarded.

In one embodiment, the second node 400 comprises at least one processor and at least one memory. The at least one memory comprises computer program codes; the at least one memory and the computer program codes are configured to be used in collaboration with the at least one processor. The second node 410 at least: receives a first radio signal, the first radio signal carries a first data unit; transmits a first status report, the first status report indicates whether a first data unit set is successfully received, the first data unit set comprises the first data unit; herein, a first variable of the first data unit is maintained; a second variable is maintained; the first status report indicates a negative confirmation for the first data unit, and the first status report indicating a negative confirmation for the first data unit is considered retransmission for the first data unit; a first variable of the first data unit being maintained comprises: when the first data unit is considered a first retransmission, a value of the first variable of the first data unit being set to 0; the second variable being maintained comprises: when all conditions in the first condition set are met, a value of the second variable being increased by 1; the first condition set comprises that the value of the first variable of the first data unit is less than a first threshold and the first data unit is indicated to be discarded.

In one embodiment, the second node 410 comprises a memory that stores a computer readable instruction program. The computer readable instruction program generates an action when executed by at least one processor. The action includes: receiving a first radio signal, the first radio signal carrying a first data unit; transmitting a first status report, the first status report indicating whether a first data unit set is successfully received, the first data unit set comprising the first data unit; herein, a first variable of the first data unit is maintained; a second variable is maintained; the first status report indicates a negative confirmation for the first data unit, and the first status report indicating a negative confirmation for the first data unit is considered retransmission for the first data unit; a first variable of the first data unit being maintained comprises: when the first data unit is considered a first retransmission, a value of the first variable of the first data unit being set to 0; the second variable being maintained comprises: when all conditions in the first condition set are met, a value of the second variable being increased by 1; the first condition set comprises that the value of the first variable of the first data unit is less than a first threshold and the first data unit is indicated to be discarded.

In one embodiment, the first communication device 450 corresponds to a first node in the present application.

In one embodiment, the second communication device 410 corresponds to a second node in the present application.

In one embodiment, the first communication device 450 is a UE.

In one embodiment, the first communication device 450 is a relay node.

In one embodiment, the first communication device 450 is a UE that supports V2X.

In one embodiment, the first communication device 450 is a vehicle equipment.

In one embodiment, the first communication device 450 is an RSU.

In one embodiment, the first communication device 410 is a base station (gNB/eNB).

In one embodiment, the second communication device 410 is a base station (gNB/eNB).

In one embodiment, the second communication device 410 is a base station that supports V2X.

In one embodiment, the second communication device 410 is a vehicle-mounted device.

In one embodiment, the second communication device 410 is an RSU device.

In one embodiment, the second communication device 410 is a UE.

In one embodiment, the second communication device 410 is a relay node.

In one embodiment, the second communication device 410 is a UE that supports V2X.

In one embodiment, at least one of the antenna 452, the transmitter 454, the multi-antenna transmitting processor 457, the transmitting processor 468 or the controller/processor 459 is used to transmit a first radio signal in the present application.

In one embodiment, at least one of the antenna 452, the receiver 454, the multi-antenna receiving processor 458, the receiving processor 456 or the controller/processor 459 is used to receive a first radio signal in the present application.

In one embodiment, at least one of the antenna 420, the transmitter 418, the multi-antenna transmitting processor 471, the transmitting processor 416, the controller/processor 475, or the memory 476 is used to transmit a first status report in the present application.

In one embodiment, at least one of the antenna 452, the receiver 454, the multi-antenna receiving processor 458, the receiving processor 456 or the controller/processor 459 is used to a first status report in the present application.

In one embodiment, the antenna 452, the transmitter 454, the multi-antenna transmitting processor 457, the transmitting processor 468 and the controller/processor 459 is used to transmit first indication in the present application.

In one embodiment, the antenna 452, the transmitter 454, the multi-antenna transmitting processor 457, the transmitting processor 468 and the controller/processor 459 is used to transmit second indication in the present application.

In one embodiment, the antenna 452, the receiver 454, the multi-antenna receiving processor 458, the receiving processor 456 or the controller/processor 459 is used to receive a third indication in the present application.

Embodiment 5

Figure 5:
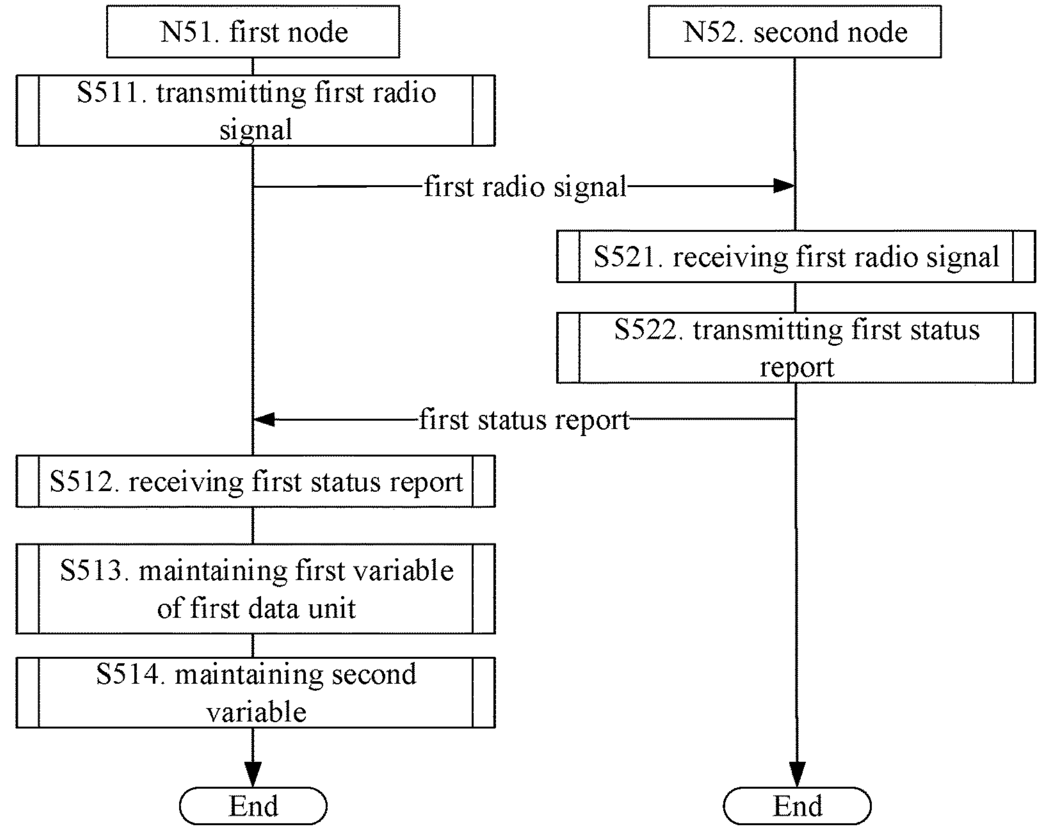
FIG. 5 illustrates a flowchart of radio signal transmission according to one embodiment of the present application.

Embodiment 5 illustrates a flowchart of radio signal transmission according to one embodiment in the present application, as shown in FIG. 5. In FIG. 5, a first node N51 and a second node N52 are in communications via an air interface. It is particularly underlined that the order illustrated in the embodiment does not put constraints over sequences of signal transmissions and implementations.

The first node N51 transmits a first radio signal in step S511, and receives a first status report in step S512; maintains a first variable of a first data unit in step S513; maintains a second variable in step S514.

The second node N52 receives a first radio signal in step S521, and transmits a first status report in step S522.

In embodiment 5, transmit a first radio signal, the first radio signal carry a first data unit; receive a first status report at a first RLC entity, the first status report indicate whether a first data unit set is successfully received, and the first data unit set comprises the first data unit; maintain a first variable of the first data unit; maintain a second variable; herein, the first status report indicates a negative confirmation for the first data unit, and the first status report indicates that a negative confirmation for the first data unit is used to confirm a retransmission for the first data unit; the maintaining a first variable of the first data unit comprises: when the first data unit is considered a first retransmission, a value of the first variable of the first data unit being set to 0; the maintaining a second variable comprises: when all conditions in the first condition set are met, a value of the second variable being increased by 1; the first condition set comprises that the value of the first variable of the first data unit is less than a first threshold and the first data unit is indicated to be discarded; the maintaining a second variable comprises: when the first status report indicates a positive confirmation for any data unit, set the value of the second variable to 0; the maintaining a first variable of the first data unit comprises, when the first data unit is not considered the first retransmission and is not pending for retransmission, and the first variable of the first data unit has not been increased due to another negative confirmation in the first status report, the value of the first variable of the first data unit is increased by 1.

In one embodiment, the second node N52 is a maintenance base station for a serving cell of the first node N51.

In one embodiment, the second node N52 is a maintenance base station of a master cell group (MCG) of the first node N51.

In one embodiment, the second node N52 is a Transmit/Receive Point (TRP) of the first node N51.

In one embodiment, the second node N52 is a maintenance base station of a primary cell of the first node N51.

In one embodiment, the second node N52 is a maintenance base station of a secondary cell of the first node N51.

In one embodiment, the second node N52 is a maintenance base station of a special cell (SpCell) of the first node N51.

In one embodiment, when a second RLC entity monitors that any condition in a second condition set is met, the second RLC entity is triggered to transmit the first status report.

In one embodiment, the second RLC entity is the peer RLC entity of the first RLC entity.

In one embodiment, the second RLC entity is located at the second node.

In one embodiment, the second RLC entity is located at RLC sublayer of the second node.

In one embodiment, the second node and the first node are not co-located.

In one embodiment, the second condition set comprises receiving polling from the first RLC entity In one embodiment, the second condition set comprises detecting AMD PDU reception failure.

In one embodiment, the second condition set comprises detecting that t-Reassembly timer expires.

In one embodiment, the maintaining a first variable of the first data unit comprises, when the first data unit is not considered a first retransmission and the first data unit is not pending for retransmission, and the first variable of the first data unit has not been increased due to another negative confirmation in the first status report, the value of the first variable of the first data unit is increased by 1.

In one embodiment, the first data unit not being considered as a first retransmission comprises: a status report indicating that the first data unit is a negative confirmation is received before receiving the first status report.

In one embodiment, the first data unit not being considered as a first retransmission comprises: the first data unit has been retransmitted at least once before receiving the first status report.

In one embodiment, the first data unit not being considered as a first retransmission comprises: a status report indicating that the first data unit is a negative confirmation is received before receiving the first status report and the first data unit has been retransmitted at least once.

In one embodiment, the first data unit is not pending for retransmission comprising: the first data unit has been retransmitted before receiving the first status report.

In one embodiment, the first data unit is not pending for retransmission comprising: the first data unit is retransmitted between two continuous status report receptions; herein, the first status report is a status report received in a latter of the two status reports.

In one embodiment, the first variable of the first data unit has not been added due to another negative confirmation in the first status report comprising: the first status report indicates at least two data units, each of the at least two data units is a RLC SDU segment of a same RLC SDU, the first data unit is one of at least two data units, and a data unit other than the first data unit in at least two data units being indicated as negative confirmation of the first variable is not used to increase the first variable of the first data unit.

In one embodiment, the first variable of the first data unit has not been added due to another negative confirmation in the first status report comprising: the first status report is used to increase the first variable of the first data unit once.

In one embodiment, the first variable of the first data unit has not been added due to another negative confirmation in the first status report comprising: the first status report is used to increase the first variable of the first data unit by 1.

In one embodiment, the maintaining a second variable comprises: when the first status report indicates a positive confirmation for any data unit, set the value of the second variable to 0.

In one embodiment, the maintaining a second variable comprises: when the first status report indicates a positive confirmation for any RLC SDU, set the value of the second variable to 0.

In one embodiment, the maintaining a second variable comprises: when the first status report indicates a positive confirmation for a data unit and an RLC SDU to which the data unit belongs is successfully received, the value of the second variable is set to 0.

In one subembodiment of the above embodiment, the data unit is an RLC SDU segment.

In one embodiment, the maintaining a second variable comprises: when the first RLC entity is established, set the value of the second variable to 0.

In one embodiment, the maintaining a second variable comprises: when the first RLC entity is re-established, set the value of the second variable to 0.

In one embodiment, the first data unit is indicated by a first identifier.

In one embodiment, the first identifier is used to indicate a set of data packets with correlation.

In one embodiment, the first identifier is a higher-layer identifier.

In one embodiment, the first identifier is comprised in application layer information.

In one embodiment, the first identifier is an identifier in an application layer header.

In one embodiment, the first identifier is an application layer sequence number.

In one embodiment, the first identifier is an identifier in a General Packet Radio Service Tunneling Protocol (GTP) packet header.

In one embodiment, the first identifier is an identifier in a Real-time Transport Protocol (RTP) packet header.

In one embodiment, the first identifier is an identifier in an IP layer header.

In one embodiment, the first identifier is an identifier in a Transmission Control Protocol (TCP) packet header.

In one embodiment, the first identifier is an identifier in a User Datagram Protocol (UDP) packet header.

In one embodiment, the first identifier is an identifier in the GTP-U (user plane) header.

In one embodiment, the first identifier is a timestamp.

In one embodiment, the first identifier is a content stamp.

In one embodiment, the first identifier is a sequence number (SN).

In one embodiment, the first identifier is a video frame number.

In one embodiment, a video frame number is used to indicate a frame in a video stream, and the first data unit comprises at least part of contents in the frame.

In one embodiment, the first identifier comprises an integral multiple of 8 bits.

In one embodiment, the first condition set comprises that the first data unit is indicated by the first identifier.

In one embodiment, the first condition set comprises that the second variable that has not been increased due to another negative confirmation in the first status report; herein, the other negative confirmation in the first status report is used to determine a retransmission for a second data unit.

In one embodiment, the second data unit is indicated by the first identifier.

In one embodiment, the second data unit is an RLC SDU.

In one embodiment, the second data unit has correlation with the first data unit.

In one embodiment, the second data unit and the first data unit belong to a same PDU set.

In one embodiment, the second data unit and the first data unit are two RLC SDU segments in a same RLC SDU.

Embodiment 6

Embodiment 6 illustrates a flowchart of radio signal transmission according to one embodiment of the present application, as shown in FIG. 6. In FIG. 6, a first RLC entity E61 and an upper layer E62 are located at the first node, and the first RLC entity E61 and the upper layer E62 are in communications through an interlayer interface. It is particularly underlined that the order illustrated in the embodiment does not put constraints over sequences of signal transmissions and implementations.

The first RLC entity E61 determines in step S611 that a value of a first variable of a first data unit is equal to a first threshold; and transmits the first indication in step S612.

The upper layer E62 receives a first indication in step S621.

In one embodiment, when the value of the first variable in the first data unit is equal to the first threshold, the first RLC entity transmits the first indication to the upper layer of the first node.

In one subembodiment of the above embodiment, the upper layer is an RRC layer.

In one embodiment, the first indication is transmitted through inter-layer interaction.

In one embodiment, the first threshold is a maximum number of retransmissions configured for any RLC SDU transmitted through the first RLC entity.

In one embodiment, the first threshold is a maxRetx-Threshold.

In one embodiment, the first indication is used to indicate that the first data unit has reached a maximum number of retransmissions.

In one embodiment, the first indication is used to indicate that one data unit in the first RLC entity has reached a maximum number of retransmissions.

In one embodiment, the first indication is used to trigger Radio Link Failure (RLF).

In one subembodiment of the above embodiment, the first RLC entity is used for transmitting in MCG.

In one subembodiment of the above embodiment, the first RLC entity is used for transmitting in a Secondary Cell Group (SCG).

In one subembodiment of the above embodiment, the first RLC entity is used for sidelink transmission, and the radio link failure is for a node where the peer RLC entity of the first RLC entity is located.

In one embodiment, the radio link failure comprises resetting a MAC of a source MCG.

In one embodiment, the radio link failure comprises releasing a source connection.

In one embodiment, the radio link failure comprises

In one embodiment, the radio link failure comprises initiating a connection re-establishment process.

In one embodiment, the first indication is used to trigger a failure information process for transmitting an RLC failure report.

In one subemdbodiment of the above embodiment, the first RLC entity is used for a transmission in an MCG, the MCG is configured and activated with a Carrier Aggregation (CA) repetition, and an allowedServingCell field of a logical channel corresponding to the first RLC entity only comprises Secondary Cell (SCell(s)).

In one subemdbodiment of the above embodiment, the first RLC entity is used for a transmission in an SCG, the SCG is configured and activated with a Carrier Aggregation (CA) repetition, and an allowedServingCell field of a logical channel corresponding to the first RLC entity only comprises Secondary Cell (SCell(s)).

In one embodiment, the RLC failure report is transmitted through a Primary Cell (PCell).

In one embodiment, the RLC failure report is transmitted through a Primary SCG Cell (PSCell).

In one embodiment, the first indication is used to indicate that the first node enters into RRC_Idle state.

In one subembodiment of the above embodiment, the first RLC entity is used for an MCG transmission and timer T319a is in a running state.

In one subembodiment of the above embodiment, the first RLC entity is used for a transmission in MCG and the first node is in Small Data Transmission (SDT) process.

Embodiment 7

Embodiment 7 illustrates a flowchart of another radio signal transmission according to one embodiment of the present application, as shown in FIG. 7. In FIG. 7, a first RLC entity E71 and an upper layer E72 are located at the first node, and the first RLC entity E71 and the upper layer E72 are in communications via an interlayer interface. It is particularly underlined that the order illustrated in the embodiment does not put constraints over sequences of signal transmissions and implementations.

The first RLC entity E71 determines in step S711 that a value of a second variable is equal to a second threshold; and transmits the second indication in step S712.

The upper layer E72 receives a second indication in step S721.

In one embodiment, when the value of the second variable is equal to the second threshold, the first RLC entity transmits the second indication to the upper layer of the first node.

In one subembodiment of the above embodiment, the upper layer is an RRC sublayer.

In one embodiment, the second indication is transmitted through inter-layer interaction.

In one embodiment, an operation triggered by the second indication is the same as an operation triggered by the first indication.

In one embodiment, an operation triggered by the second indication is different from an operation triggered by the first indication.

In one embodiment, the second indicator is used for an RRC reconfiguration.

In one embodiment, the second indicator is used to reconfigure the first threshold.

In one embodiment, the second indication is carried in a MAC Control Element (CE).

In one embodiment, the second indication is carried in an RRC signaling.

In one embodiment, the second indication is carried in rlf Cause.

In one embodiment, the second indication is carried in an SCGFailureInformationNR message.

In one embodiment, the second indication is carried in an MCGFailureInformationNR message.

In one embodiment, the second indication is used to trigger Radio Link Failure (RLF).

In one subembodiment of the above embodiment, the first RLC entity is used for transmitting in MCG.

In one subembodiment of the above embodiment, the first RLC entity is used for transmitting in a Secondary Cell Group (SCG).

In one subembodiment of the above embodiment, the first RLC entity is used for sidelink transmission, and the radio link failure is for a node where the peer RLC entity of the first RLC entity is located.

In one embodiment, the second indication is used to trigger a failure information process for transmitting an RLC failure report.

In one subemdbodiment of the above embodiment, the first RLC entity is used for a transmission in an MCG, the MCG is configured and activated with a Carrier Aggregation (CA) repetition, and an allowedServingCell field of a logical channel corresponding to the first RLC entity only comprises Secondary Cell (SCell(s)).

In one subemdbodiment of the above embodiment, the first RLC entity is used for a transmission in an SCG, the SCG is configured and activated with a Carrier Aggregation (CA) repetition, and an allowedServingCell field of a logical channel corresponding to the first RLC entity only comprises Secondary Cell (SCell(s)).

In one embodiment, the second indication is used to indicate that the first node enters into RRC_Idle state.

In one subembodiment of the above embodiment, the first RLC entity is used for an MCG transmission and timer T319a is in a running state.

In one subembodiment of the above embodiment, the first RLC entity is used for a transmission in MCG and the first node is in Small Data Transmission (SDT) process.

In one embodiment, the second threshold is configured by network.

In one embodiment, the second threshold is pre-configured.

In one embodiment, the second threshold is configured to the first RLC entity.

In one embodiment, the second threshold is a continuous maximum number of RLC SDUs that are configured to be discarded before reaching a maximum number of retransmissions through the first RLC entity.

In one embodiment, the second threshold is a continuous maximum number of data units that are configured to be discarded before reaching a maximum number of retransmissions through the first RLC entity, and the data unit is an RLC SDU or an RLC SDU segment.

In one embodiment, the second threshold is maxDiscardThreshold.

Embodiment 8

Embodiment 8 illustrates a flowchart of a third signal transmission according to another embodiment in the present application, as shown in FIG. 8. In FIG. 8, a first RLC entity E81 and a PDCP sublayer E82 are located at the first node, and the first RLC entity E81 and the PDCP sublayer E82 are in communications via an interlayer interface. It is particularly underlined that the order illustrated in the embodiment does not put constraints over sequences of signal transmissions and implementations.

The first RLC entity E81 receives a third indication in step S811; discards a first data unit in step S812.

The PDCP sublayer E82 transmits a third indication in step S721.

In one embodiment, a third indication is received at the first RLC entity.

In one embodiment, the third indication is used to indicate discarding the first data unit.

In one embodiment, a PDCP sublayer of the first node transmits the third indication to the first RLC entity.

In one embodiment, the third indication is transmitted through inter-layer interaction.

In one embodiment, when a first PDCP SDU is received at a PDCP sublayer of the first node, a first timer starts, when the first timer expires, a PDCP sublayer of the first node transmits the third indication to the first RLC entity of the first node; herein, the first PDCP SDU is used to generate the first data unit.

In one embodiment, the first timer is maintained at the PDCP sublayer.

In one embodiment, the first timer is a discardTimer.

In one embodiment, the first timer is in a running state after starting.

In one embodiment, when the first timer is in a running state, the first timer is updated in a following time interval, and then it is judged whether the first timer is expired.

In one embodiment, the time interval comprises 1 ms.

In one embodiment, when starting the first timer, set a value of the first timer to 0, and the phrase of updating the first timer comprises: increasing a value of the first timer by 1; when a value of the first timer reaches the first time threshold, it is determined that the first timer is expired.

In one embodiment, when starting the first timer, set a value of the first timer to the first time threshold, and the phrase of updating the first timer comprises: decreasing a value of the first timer by 1; when a value of the first timer is 0, it is determined that the first timer is expired.

In one embodiment, the first time threshold is used to determine an expiration of the first timer.

In one embodiment, the first time threshold is configured by network.

In one embodiment, the first time threshold is a maximum time that the first PDCP SDU resides in the PDCP sublayer.

In one embodiment, the first time threshold is a maximum time that the first PDCP SDU resides in the PDCP sublayer and below.

In one embodiment, the first PDCP SDU being used to generate the first data unit comprises: the first PDCP SDU is processed by at least a former of a PDCP protocol and an RLC protocol to generate the first data unit.

In one embodiment, the PDCP protocol processing comprises Integrity protection and verification.

In one embodiment, the PDCP protocol processing comprises ciphering.

In one embodiment, the PDCP protocol processing comprises RObust Header Compression (ROHC).

In one embodiment, the PDCP protocol processing comprises adding a PDCP protocol header.

In one embodiment, the RLC protocol processing comprises an RLC SDU segment.

In one embodiment, a MAC sublayer of the first node transmits the third indication to the first RLC entity of the first node.

In one embodiment, a first remaining packet delay budget (remaining PDB) of the first data unit is maintained in the MAC sublayer of the first node, and when the first data unit is not successfully transmitted within the first remaining PDB, the MAC sublayer of the first node transmits the third indication to the first RLC entity of the first node.

In one embodiment, the first remaining PDB is equal to a difference between the processing time in the PDCP sublayer and the RLC sublayer protocols, respectively, subtracted from the first time threshold.

In one embodiment, a second remaining PDB of the first data unit is maintained at the first RLC entity, and when the first data unit is not successfully transmitted with the second remaining PDB, the first RLC entity receives the third indication.

In one subembodiment of the above embodiment, the third indication is transmitted within the first RLC entity.

In one embodiment, a delay budget for the second remaining data packet is equal to a difference of the first time threshold minus the processing time in the PDCP sublayer protocol.

In one embodiment, the third indication comprises a sequence number of the first data unit.

In one embodiment, when the third indication is received from PDCP sublayer of the first node, the sequence number of the first data unit is PDCP SN.

In one embodiment, when the third indication is received from MAC sublayer of the first node, the sequence number of the first data unit is RLC SN.

In one embodiment, as a response to receiving the third indication, the first data unit is discarded at the first RLC entity.

In one embodiment, the discarding the first data unit comprises: discarding an RLC SDU to which the first data unit belongs; herein, the first data unit is an RLC SDU segment.

In one embodiment, the discarding the first data unit comprises: discarding the first data unit and an RLC SDU segment that belong to a same RLC SDU as the first data unit; herein, the first data unit is an RLC SDU segment.

In one embodiment, the discarding the first data unit comprises: discarding the first data unit and an RLC PDU generated by the first data unit.

In one embodiment, the discarding the first data unit comprises: the first data unit is not retransmitted.

In one embodiment, the discarding the first data unit comprises: an RLC SDU to which the first data unit belongs is not retransmitted.

In one embodiment, the discarding the first data unit comprises: an RLC SDU segment that belong to a same RLC SDU as the first data unit not being retransmitted; herein, the first data unit is an RLC SDU segment.

In one embodiment, a radio bearer associated with the first RLC entity belongs to the first-type radio bearer.

In one embodiment, the first RLC entity transmits data to lower layer through a logical channel, and the logical channel belongs to the first-type logical channel.

In one embodiment, the first data unit belongs to the first-type radio bearer.

In one embodiment, the first data unit belongs to a first RLC carrier, and a radio bearer served by the first RLC bearer belongs to the first-type radio bearer.

In one embodiment, the first-type radio bearer is non-signaling radio bearer.

In one embodiment, the first-type radio bearer is a radio bearer other than Signaling Radio Bearer (SRB).

In one embodiment, the first-type radio bearer comprises a Data Radio Bearer (DRB).

In one embodiment, the first-type radio bearer comprises an MBS radio bearer (MRB).

In one embodiment, the first-type radio bearer comprises a Sidelink (SL) DRB.

In one embodiment, a first-type QoS flow is mapped to the first-type radio bearer, and the first-type QoS flow is used for delay sensitive services.

In one embodiment, a first PDU set is mapped to a radio bearer in the first-type radio bearer.

In one embodiment, when the first data unit belongs to the first-type radio bearer, unlike the existing technologies, discarding the first data unit when it has been submitted to the lower layer for transmission and receiving a negative confirmation and a third indication can save radio resources.

Embodiment 9

Figure 9:
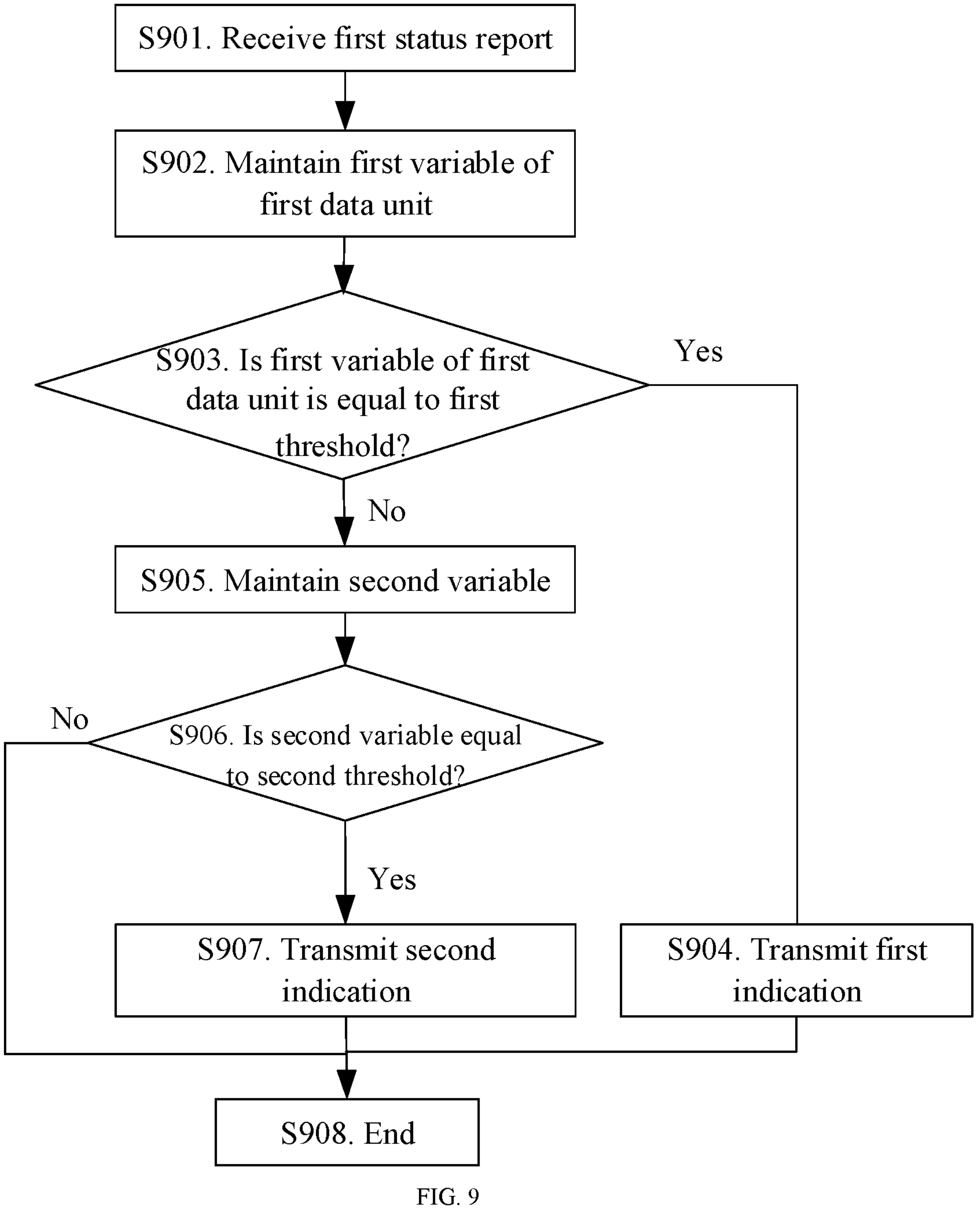
FIG. 9 illustrates a flowchart of signal processing according to one embodiment of the present application.

Embodiment 9 illustrates a flowchart of signal processing according to one embodiment in the present application, as shown in FIG. 9. The procedure in FIG. 9 is executed in a first RLC entity.

In embodiment 9, a first status report is received in step S901; maintains a first variable of a first data unit in step S902; judges in step S903 whether a first variable of the first data unit is equal to a first threshold; if yes, executes step S904, if no, execute step S905; transmits a first indication in step S904; maintains a second variable in step S905; judges whether a second variable is equal to the second threshold in step S906; if yes, executes step S907, if no, execute step S908; transmits a second instruction in step S907; ends in step S908.

It should be noted that before receiving the first status report, the first RLC entity transmits the first data unit set, and the first data unit set comprises the first data unit.

In one embodiment, a reception time of the third indication is earlier than a reception time of the first status report.

In one subembodiment of the above embodiment, a status report indicating that the first data unit is a negative confirmation is not received before receiving the first status report.

In one embodiment, a reception time of the third indication is later than a reception time of the first status report.

In one subembodiment of the above embodiment, a status report indicating that the first data unit is a negative confirmation is not received before receiving the third indication.

Embodiment 10

Embodiment 10 illustrates a structure schematic diagram of a first status report according to one embodiment of the present application, as shown in FIG. 10.

In one embodiment, the first status report comprises an RLC control PDU header, the RLC control PDU header comprises a D/C (data/control) field and a Control PDU Type (CPT) field; a value of the D/C field is 0; a value of the CPT field is 000, indicating STATUS PDU.

In FIG. 10, an Acknowledgement (ACK) sequence number (ACK_SN) field indicates a sequence number of a next RLC SDU to be received; Extension 1 (E1) field indicates whether there are more NACKs_Sn, E1s, E2s and E3s; R field is reserved; a Negative Acknowledgement (NACK) sequence number (NACK_SN) field indicates a sequence number of an RLC SDU or an RLC SDU segment that is not successfully received; a E2 field indicates whether there are SOstart and SOend after the NACK_SN field, and the NACK_SN field is associated with the SOstart and the SOend respectively; a E3 field indicates whether there is a NACK range field after the NACK_SN field, and the NACK_SN field is associated with the NACK range; the SOstart and the SOend respectively indicate a start byte and an end byte of an RLC SDU segment indicated by the NACK_SN in an original RLC SDU; the NACK range field indicates a number of consecutive RLC SDUs not successfully received starting from NACK_SN; herein, as shown in FIG. 10, the ACK_SN field and the NACK_SN field respectively comprise 12 bits; formats of the ACK_SN field and the NACK_SN field respectively comprising 18 bits refer to 3GPP specification 38.322.

In one embodiment, at least a former of the NACK_SN field, the SOstart field, the SOend field, and the NACK range field in the first status report is used to indicate a data unit set not successfully received.

In one embodiment, the NACK_SN field in the first status report indicates a sequence number of the first data unit.

In one embodiment, the NACK_SN field, the SOstart field and the SOend field in the first status report indicates a sequence number of the first data unit.

In one embodiment, the NACK_SN field and the NACK range field in the first status report indicates a sequence number of the first data unit.

In one embodiment, the NACK_SN field, the SOstart field, the SOend field and NACK range field in the first status report indicates a sequence number of the first data unit.

In one embodiment, a sequence number indicated by the ACK_SN field in the first status report and an RLC SDU smaller than the sequence number indicated by the ACK_SN field are successfully received.

Embodiment 11

Embodiment 11 illustrates a structure block diagram of a processor in a first node according to one embodiment of the present application, as shown in FIG. 11.

In FIG. 11, a processor 1100 in a first node comprises a first receiver 1101, a first transmitter 1102 and a first processor 1103. the first node 1000 is a UE or a base station.

In embodiment 11, the first transmitter 1102 transmits a first radio signal, and the first radio signal carries a first data unit; a first receiver 1101 receives a first status report at a first RLC entity, the first status report indicates whether a first data unit set is successfully received, the first data unit set comprises the first data unit; a first processor 1103 maintains a first variable of the first data unit; maintains a second variable; herein, the first status report indicates a negative confirmation for the first data unit, and the first status report indicating a negative confirmation for the first data unit is considered retransmission for the first data unit; the maintaining a first variable of the first data unit comprises: when the first data unit is considered a first retransmission, a value of the first variable of the first data unit being set to 0; the maintaining a second variable comprises: when all conditions in the first condition set are met, a value of the second variable being increased by 1; the first condition set comprises that the value of the first variable of the first data unit is less than a first threshold and the first data unit is indicated to be discarded.

In one embodiment, the maintaining a second variable comprises: when the first status report indicates a positive confirmation for any data unit, set the value of the second variable to 0.

In one embodiment, the first processor 1103, when a value of the first variable of the first data unit is equal to the first threshold, transmits a first indication to an upper layer of the first node, the first indication is used to indicate reaching a maximum number of retransmissions.

In one embodiment, the first processor 1103, when a value of the second variable is equal to a second threshold, transmits a second indication to an upper layer of the first node.

In one embodiment, the first processor 1103 receives a first PDCP SDU at a PDCP sublayer, starts a first timer; when the first timer expires, transmitting a third indication to the first RLC entity; herein, the first PDCP SDU is used to generate the first data unit, and the third indication is used to indicate discarding the first data unit.

In one embodiment, the first processor 1103 receives a first PDCP SDU at a PDCP sublayer, starts a first timer; when the first timer expires, transmitting a third indication to the first RLC entity; herein, the first PDCP SDU is used to generate the first data unit, and the third indication is used to indicate discarding the first data unit; the first processor 1103, as a response to receiving the third indication, discards the first data unit; herein, the first RLC entity is associated with the first-type radio bearer.

In one embodiment, the maintaining a first variable of the first data unit comprises, when the first data unit is not considered the first retransmission and is not pending for retransmission, and the first variable of the first data unit has not been increased due to another negative confirmation in the first status report, the value of the first variable of the first data unit is increased by 1.

In one embodiment, the first receiver 1101 comprises the receiver 454 (comprising the antenna 452), the receiving processor 456, the multi-antenna receiving processor 458 and the controller/processor 459 in FIG. 4 of the present application.

In one embodiment, the first receiver 1101 comprises at least one of the receiver 454 (comprising the antenna 452), the receiving processor 456, the multi-antenna receiving processor 458 or the controller/processor 459 in FIG. 4 of the present application.

In one embodiment, the first transmitter 1102 comprises the receiver 454 (comprising the antenna 452), the transmitting processor 468, the multi-antenna transmitting processor 457 and the controller/processor 459 in FIG. 4 of the present application.

In one embodiment, the first transmitter 1102 comprises at least one of the receiver 454 (comprising the antenna 452), the transmitting processor 468, the multi-antenna transmitting processor 457 or the controller/processor 459 in FIG. 4 of the present application.

In one embodiment, the first processor 1103 comprises the controller/processor 459 in FIG. 4 of the present application.

In one embodiment, the first processor 1103 is used for inter-layer communications.

In one embodiment, the first processor 1103 comprises an inter-layer transmission primitive and a reception primitive.

In one embodiment, the first processor 1103 comprises a set of instructions for completing transmission function and a set of instructions for completing reception function.

Embodiment 12

Embodiment 12 illustrates a structure block diagram of a processor in a second node according to one embodiment of the present application, as shown in FIG. 12. In FIG. 12, a processor 1200 in a second node comprises a second receiver 1201 and a second transmitter 1202; the second node 1200 is a base station or a UE.

In embodiment 12, the second receiver 1201 receives a first radio signal, and the first radio signal carries a first data unit; the second transmitter 1202 transmits a first status report, the first status report indicates whether a first data unit set is successfully received, the first data unit set comprises the first data unit; herein, a first variable of the first data unit is maintained; a second variable is maintained; the first status report indicates a negative confirmation for the first data unit, and the first status report indicating a negative confirmation for the first data unit is considered retransmission for the first data unit; a first variable of the first data unit being maintained comprises: when the first data unit is considered a first retransmission, a value of the first variable of the first data unit being set to 0; the second variable being maintained comprises: when all conditions in the first condition set are met, a value of the second variable being increased by 1; the first condition set comprises that the value of the first variable of the first data unit is less than a first threshold and the first data unit is indicated to be discarded.

In one embodiment, the second variable being maintained comprises: when the first status report indicates a positive confirmation for any data unit, the value of the second variable is set to 0.

In one embodiment, when the value of the first variable of the first data unit is equal to the first threshold, transmitting a first indication to an upper layer of a transmitter of the first radio signal, and the first indication indicating reaching a maximum number of retransmissions.

In one embodiment, when the value of the second variable is equal to a second threshold, a second indication being transmitted to an upper layer of a transmitter of the first radio signal.

In one embodiment, when a first PDCP SDU is received at a PDCP sublayer, a first timer is started; when the first timer expires, a third indication is transmitted to the first RLC entity; herein, the first PDCP SDU is used to generate the first data unit, and the third indication is used to indicate discarding the first data unit.

In one embodiment, when a first PDCP SDU is received at a PDCP sublayer, a first timer is started; when the first timer expires, a third indication is transmitted to the first RLC entity; herein, the first PDCP SDU is used to generate the first data unit, and the third indication is used to indicate discarding the first data unit; as a response to receiving the third indication, the first data unit is discarded; herein, the first RLC entity is associated with the first-type radio bearer.

In one embodiment, the maintaining a first variable of the first data unit comprises, when the first data unit is not considered the first retransmission and is not pending for retransmission, and the first variable of the first data unit has not been increased due to another negative confirmation in the first status report, the value of the first variable of the first data unit is increased by 1.

In one embodiment, the second receiver 1201 comprises the transmitter 418 (comprising the antenna 420), the receiving processor 470, the multi-antenna receiving processor 472 and the controller/processor 475 in FIG. 4 in the present application.

In one embodiment, the second receiver 1201 comprises at least one of the transmitter 418 (comprising the antenna 420), the receiving processor 470, the multi-antenna receiving processor 472 or the controller/processor 475 in FIG. 4 in the present application.

In one embodiment, the second transmitter 1202 comprises the transmitter 418 (including the antenna 420), the transmitting processor 416, the multi-antenna transmitting processor 471 and controller/processor 475 in FIG. 4 of the present application.

In one embodiment, the second transmitter 1202 comprises at least one of the transmitter 418 (including the antenna 420), the transmitting processor 416, the multi-antenna transmitting processor 471 or the controller/processor 475 in FIG. 4 of the present application.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. A first-type communication node or a UE or a terminal in the present application includes but not limited to mobile phones, tablet computers, laptops, network cards, low-power devices, enhanced Machine Type Communication (eMTC) devices, NB-IOT devices, vehicle-mounted communication equipment, aircrafts, airplanes, unmanned aerial vehicles (UAV), tele-controlled aircrafts and other wireless communication devices. The second-type communication node or the base station or the network side device in the present application includes but is not limited to the macro-cellular base stations, micro-cellular base stations, home base stations, relay base stations, eNB, gNB, Transmission and Reception Points (TRP), relay satellites, satellite base stations, air base stations, testing equipment, such as transceiver devices that simulate some functions of base stations, signaling testers and other wireless communication equipment.

It will be appreciated by those skilled in the art that this disclosure can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A user equipment (UE) for wireless communications, the UE comprising:
- a transceiver; and
- a processor, wherein the transceiver and the processor are configured to:
  - transmit a radio signal comprising a data unit,
  - receive, at a Radio Link Control Protocol (RLC) entity of the UE, a status report associated with a data unit set comprising the data unit,
  - on a condition that the status report indicates a negative confirmation for the data unit, determine that the data unit is a first retransmission,
  - maintain a first variable associated with the data unit,
  - set the first variable to zero based upon determining that the data unit is a first retransmission,
  - maintain a second variable,
  - determine that a value of the first variable is less than a first threshold and the data unit is indicated to be discarded, wherein the first threshold is associated with the RLC entity,
  - increment the second variable by 1 based upon determining that the value of the first variable is less than a first threshold and the data unit is indicated to be discarded, and
  - on a condition that the status report indicates a positive confirmation for any data unit in the data unit set, set the value of the second variable to 0.

2. The UE according to claim 1, wherein the transceiver and the processor are further configured to:
- determine that the value of the first variable of the data unit is equal to the first threshold, and
- transmit, to an upper layer of the UE, a first indication indicating reaching a maximum number of retransmissions.

3. The UE according to claim 1, wherein the transceiver and the processor are further configured to:
- determine that the value of the second variable is equal to a second threshold, and
- transmit a second indication to an upper layer of the UE, wherein the second threshold is configured by a network or pre-configured, and wherein the second indication is used to trigger a radio link failure.

4. The UE according to claim 1, wherein the transceiver and the processor are further configured to:
- receive a Packet Data Convergence Protocol (PDCP) Service Data Unit (SDU) at a PDCP sublayer,
- start a first timer,
- when the first timer expires, transmit a third indication to the RLC entity, wherein the PDCP SDU is used to generate the data unit, and wherein the third indication is used to indicate discarding the data unit.

5. The UE according to claim 4, wherein the transceiver and the processor are further configured to:
- as a response to receiving the third indication, discard the data unit, wherein the RLC entity is associated with a first-type radio bearer, and wherein the data unit belongs to the first-type radio bearer.

6. The UE according to claim 1, wherein maintaining the first variable comprises:

determining that the data unit is not considered the first retransmission and is not pending for retransmission, and the first variable has not been increased due to another negative confirmation in the status report, incrementing the value of the first variable by 1.

7. A base station for wireless communications, the base station comprising:

a transceiver; and a processor, wherein the transceiver and the processor are configured to:

receive a radio signal, the radio signal carrying a data unit, transmit a status report to a Radio Link Control Protocol (RLC) entity of a user equipment (UE), wherein the status report indicates whether a data unit set is successfully received, and wherein the data unit set comprises the data unit, and wherein:

a first variable associated with the data unit is maintained, a second variable is maintained, the status report indicates a negative confirmation for the data unit, and the status report indicating the negative confirmation for the data unit is considered retransmission for the data unit, a first variable of the data unit being maintained comprises: when the data unit is considered a first retransmission, a value of the first variable of the data unit being set to 0, the second variable being maintained comprises: when all conditions in a first condition set are met, increasing the value of the second variable being increased by 1, and when the status report indicates a positive confirmation for any data unit in the data unit set, the value of the second variable is set to 0, the first condition set comprises that the value of the first variable of the data unit is less than a first threshold and the data unit is indicated to be discarded, and the first threshold is configured to the RLC entity.

8. The base station according to claim 7, wherein when the value of the first variable of the data unit is equal to the first threshold, a first indication is transmitted to an upper layer of a transmitter of the radio signal, and the first indication indicates reaching a maximum number of retransmissions.

9. The base station according to claim 7, wherein when the value of the second variable is equal to a second threshold, a second indication is transmitted to an upper layer of a transmitter of the radio signal, and wherein the second threshold is configured by a network or pre-configured, and wherein the second indication is used to trigger a radio link failure.

10. The base station according to claim 7, wherein when a Packet Data Convergence Protocol (PDCP) Service Data Unit (SDU) is received at a PDCP sublayer, a first timer is started, and wherein when the first timer expires, a third indication is transmitted to the RLC entity, and wherein the PDCP SDU is used to generate the data unit, and the third indication is used to indicate discarding the data unit.

11. The base station according to claim 10, wherein as a response to receiving the third indication, the data unit is discarded, and wherein, the RLC entity is associated with a first-type radio bearer, and the first condition set comprises the data unit belonging to the first-type radio bearer.

12. A method in a user equipment (UE) for wireless communications, the method comprising:

transmitting a radio signal comprising a data unit;

receiving, at a Radio Link Control Protocol (RLC) entity of the UE, a status report associated with a data unit set comprising the data unit;

on a condition that the status report indicates a negative confirmation for the data unit, determining that the data unit is a first retransmission;

maintaining a first variable associated with the data unit, setting the first variable to zero based upon determining that the data unit is a first retransmission, maintaining a second variable, determining that the first variable is less than a first threshold and the data unit is indicated to be discarded, wherein the first threshold is configured to the RLC entity;

incrementing the second variable by 1 based upon determining that a value of the first variable is less than a first threshold and the data unit is indicated to be discarded; and on a condition that the status report indicates a positive confirmation for any data unit in the data unit set, setting the value of the second variable to 0.

13. The method in the UE according to claim 12, further comprising:

determining that the value of the first variable of the data unit is equal to the first threshold; and transmitting, to an upper layer of the UE, a first indication indicating reaching a maximum number of retransmissions.

14. The method in the UE according to claim 12, further comprising:

determining that the value of the second variable is equal to a second threshold, and transmitting a second indication to a upper layer of the UE, wherein the second threshold is configured by a network or pre-configured, and wherein the second indication is used to trigger a radio link failure.

15. The method in the UE according to claim 12, further comprising:

receiving a Packet Data Convergence Protocol (PDCP) Service Data Unit (SDU) at a PDCP sublayer;

starting a first timer; and when the first timer expires, transmitting a third indication to the RLC entity, wherein the PDCP SDU is used to generate the data unit, and wherein the third indication is used to indicate discarding the data unit.

16. The method in the UE according to claim 15, further comprising:

as a response to receiving the third indication, discarding the data unit, wherein the RLC entity is associated with a first-type radio bearer, and wherein the data unit belongs to the first-type radio bearer.

17. The method in the UE according to claim 12, wherein maintaining the first variable of the data unit comprises:

determining the data unit is not considered the first retransmission and is not pending for retransmission, and the first variable has not been increased due to another negative confirmation in the status report, incrementing the value of the first variable by 1.

* * * * *